United States Patent [19]

Heimann

[11] 4,143,582

[45] Mar. 13, 1979

[54] METHOD AND APPARATUS FOR MAKING A SECONDARY KEY FOR A LOCK MECHANISM

[76] Inventor: Joseph B. Heimann, 502 Marlbrook La., Lansdale, Pa. 19446

[21] Appl. No.: 790,824

[22] Filed: Apr. 25, 1977

[51] Int. Cl.² .............................................. B23C 3/24
[52] U.S. Cl. ................................................. 90/13.05
[58] Field of Search ........................ 90/13.05; 76/110; 164/13, 15; 425/2; 234/89

[56] References Cited

U.S. PATENT DOCUMENTS

| 3,209,996 | 10/1965 | Carson et al. | 234/89 X |
| 4,012,991 | 3/1977 | Uyeda | 90/13.05 |

OTHER PUBLICATIONS

"Metals Handbook," 8th Edition, Forging and Casting Published by "American Society of Metals" Metals Park, Ohio 44073- p. 181.

Primary Examiner—Horace M. Culver
Attorney, Agent, or Firm—Kenyon & Kenyon, Reilly, Carr & Chapin

[57] ABSTRACT

A small and simply operated recording apparatus employing an elastic pressure element is utilized to make a three dimensional recording in thin metallic foil from each of the two sides of a primary key from which a secondary key is to be manufactured, the recordings placed in an interpreting apparatus, which may be located remotely from the recording apparatus, which permits extraction of precise three dimensional data stored in the recordings whereafter the extracted data is utilized in key cutting apparatus to produce a secondary key, in all comprising a key making system.

10 Claims, 20 Drawing Figures

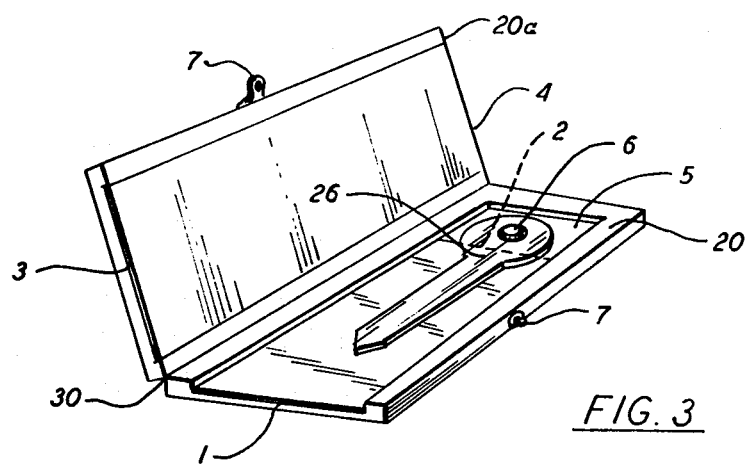
FIG. 3
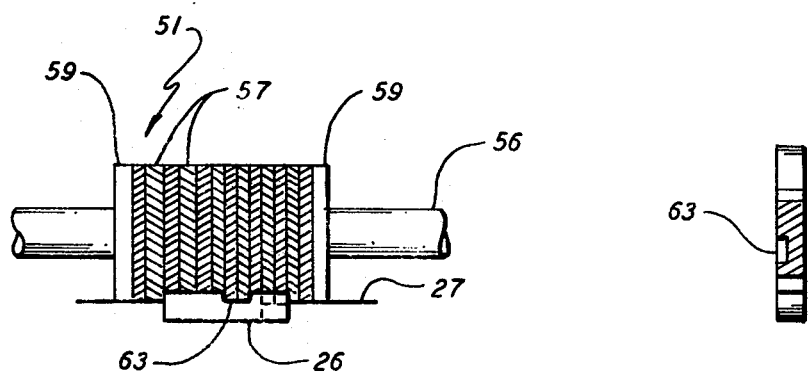
FIG. 5
FIG. 6a
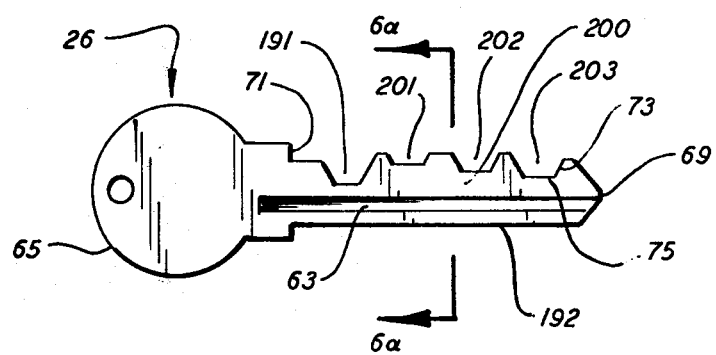
FIG. 6

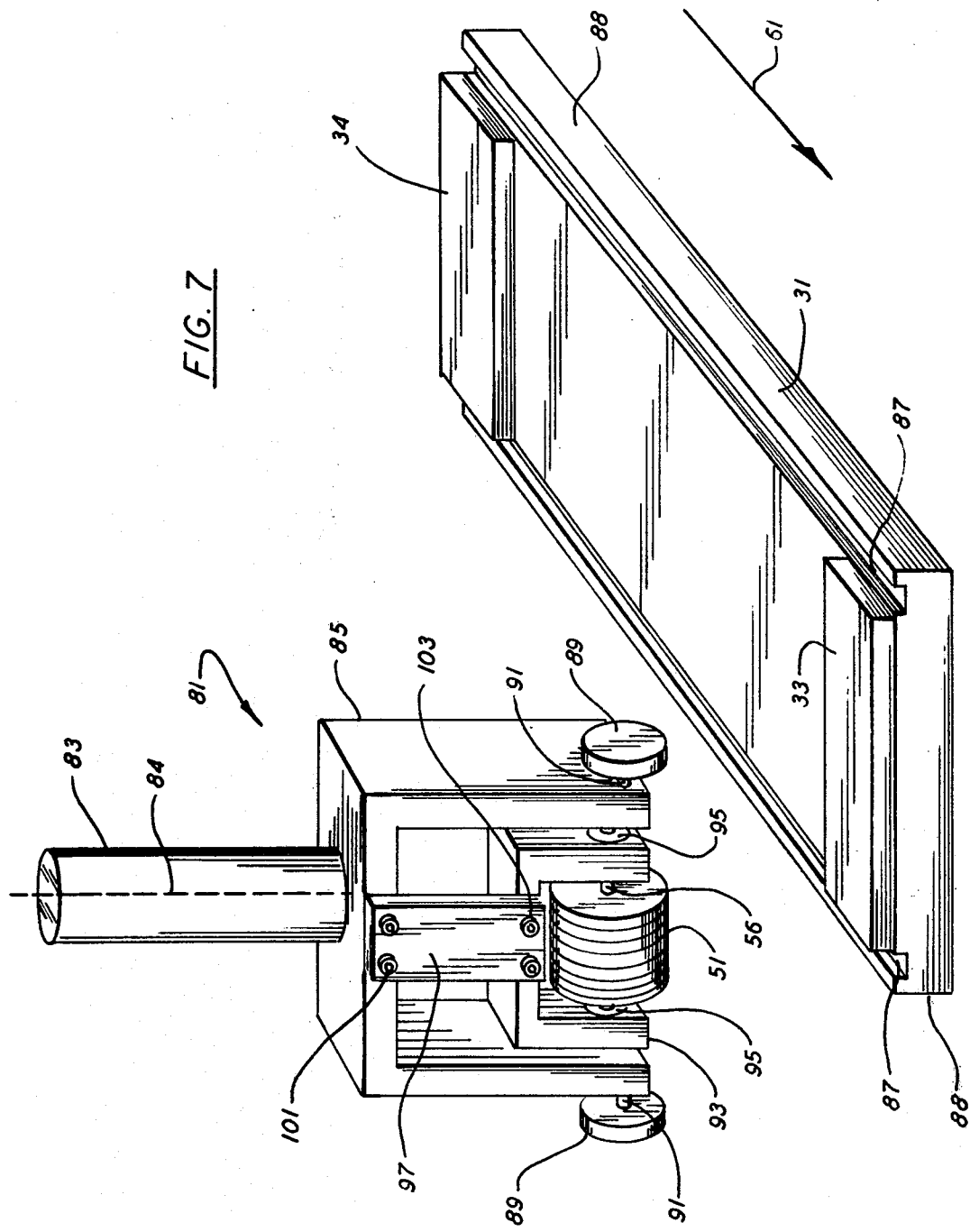

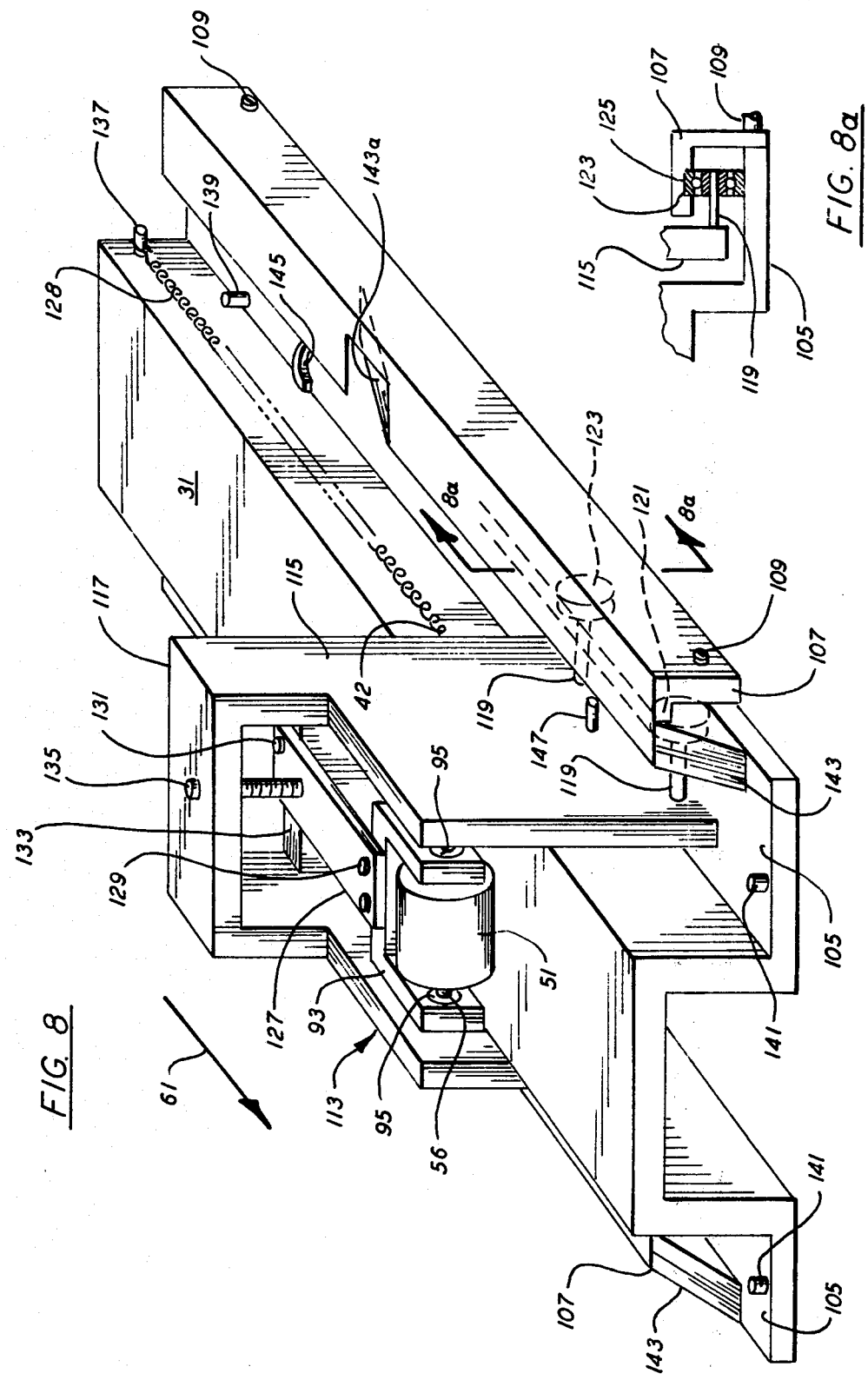

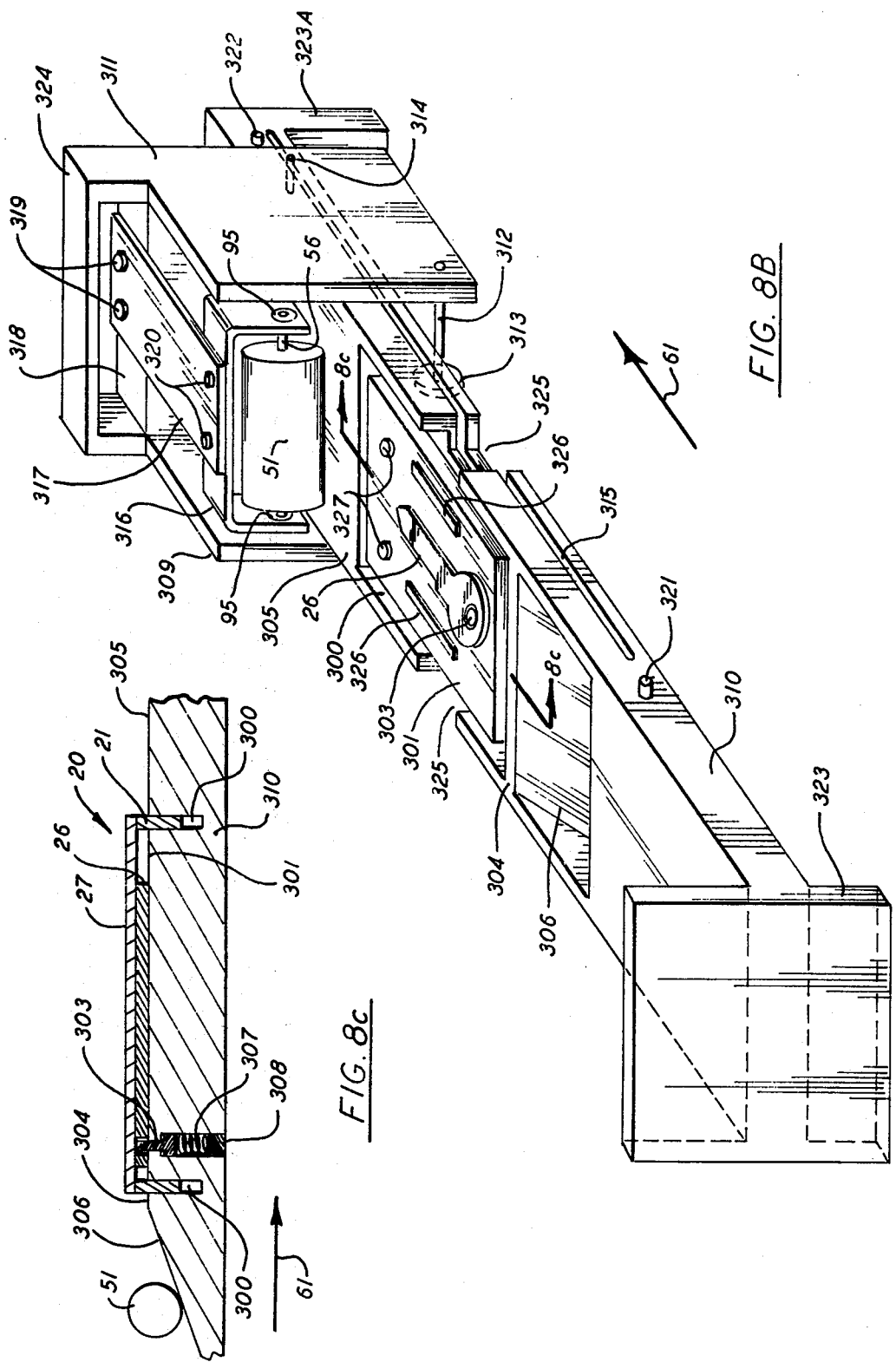

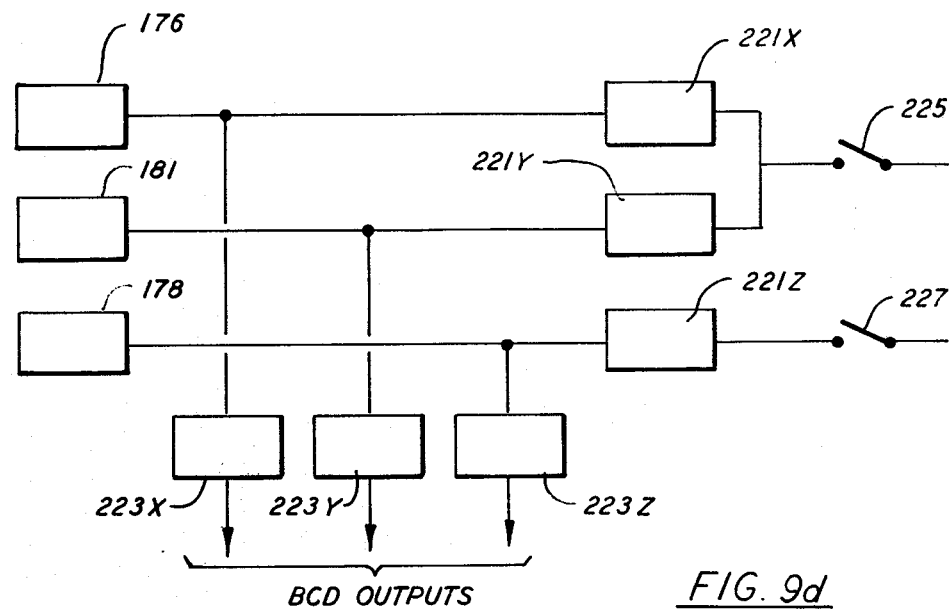
FIG. 9d
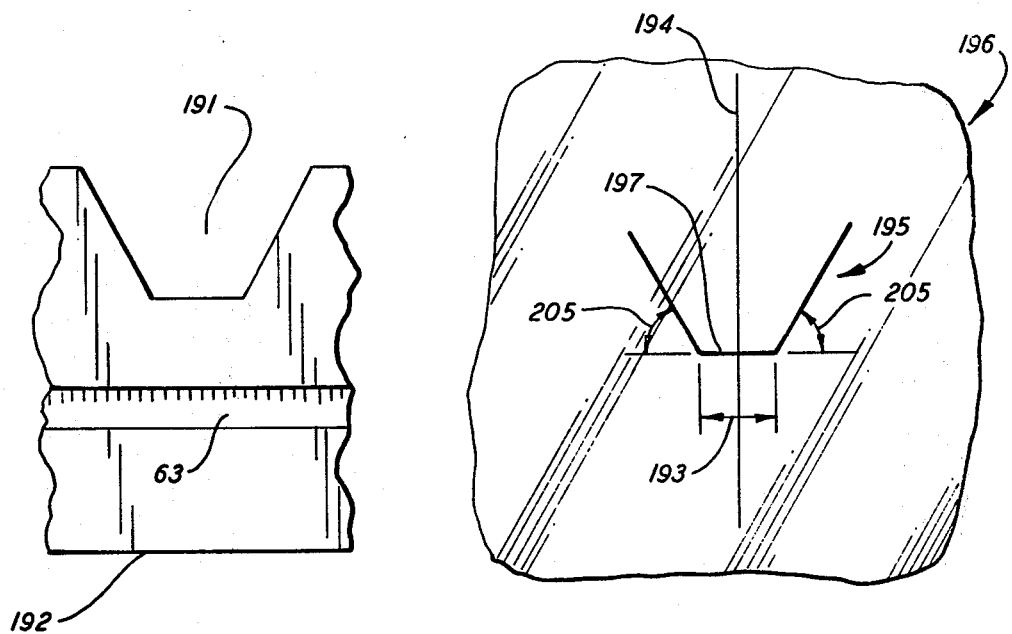
FIG. 10
FIG. 11

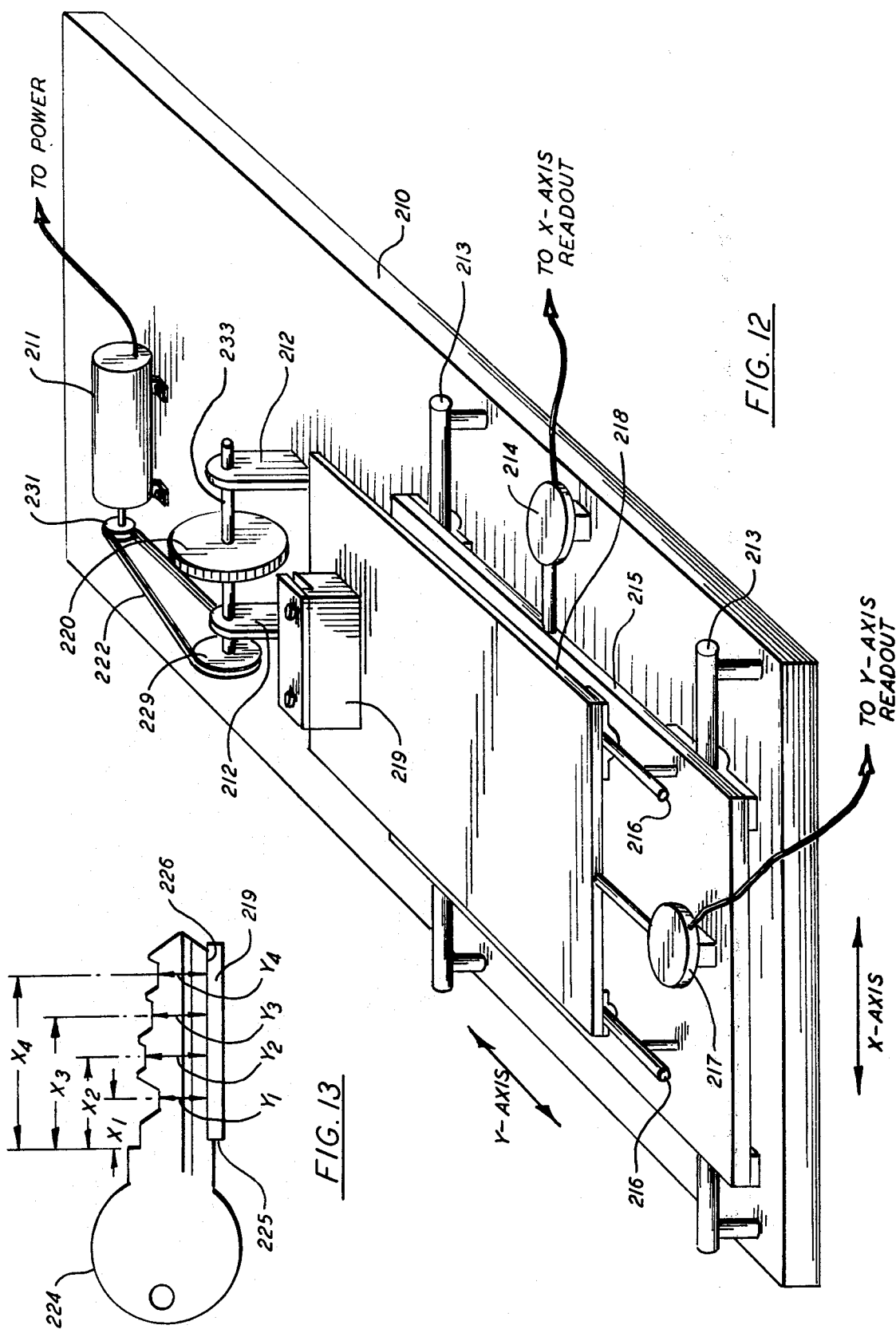

METHOD AND APPARATUS FOR MAKING A SECONDARY KEY FOR A LOCK MECHANISM

BACKGROUND OF THE INVENTION

1. Field of the Invention

The present invention relates to key making in general and more particularly to an improved method and apparatus for making keys.

As used herein, a key which operates a given lock or locks is termed a primary key. A key manufactured by reference to a primary key, without requiring reference to the lock which is to be operated and which key is capable of operating the same lock or locks as the primary key is termed a secondary key.

Presently there are a number of ways in which a secondary key may be manufactured. One common way is by an owner of the primary key taking it or sending it to a professional locksmith or to a conventional key maker in a hardware store, variety store, or other establishment having key making facilities. The secondary key is manufactured on the spot using equipment, supplies, and skilled personnel available there. Manufacture is carried out by reference to the actual dimensions of the primary key (dimensional matching), and/or by reference to coded dimensional information and/or uncoded general information (such as the name of the lock manufacturer), sometimes contained in alpha-numeric characters on the primary key for purposes of identification and manufacture.

Another common way occurs in the event the primary key does contain clear and complete coded and/or uncoded information which may be used for purposes of identification and manufacture, and such information is recognized and understood by the owner of the primary key. This information may be communicated by the owner to a professional locksmith or to the maker of the lock operated by the primary key and the secondary key may be manufactured without the manufacturer having access to the primary key itself.

Although the presently used methods of producing secondary keys are usually workable they suffer from a number of disadvantages. First, only a locksmith or conventional key maker having considerable key making skill, equipment, and supplies can respond to the owner of a primary key who desires a secondary key. These attributes are not often, if ever, possessed by individuals in the jewelry trade, or others associated with the jewelry trade who otherwise would be able to service customers desiring jeweled or decorated secondary keys, nor is it practical or economically feasible for a jeweler or others associated with the jewelry trade to acquire such attributes. The thousands of different key blanks and the large number of decorative options which would be required, even if modularly assembled together, would involve so many possible combinations, and inventory and skill requirements, as to be economically unsound for a jeweler or others associated with the jewelry trade to possess if related only to sales of decorated keys made at one or even a few retail locations. Thus there is no practical present method of accommodating those potential customers.

Secondly, when the secondary key is produced directly by dimensional matching to the primary key it may contain cumulative dimensional error from two sources and thus may not be the best secondary key which could have been made. The primary key, if it is not an original key which came with the lock when both lock and key were brand new, and if it were not produced by code, two conditions often applying, was made by dimensional matching to a prior key which in turn may have been made by dimensional matching to a prior key, etc. With each event of manufacture a certain amount of dimensional error occurs due to the process of manufacture alone. The primary key and its predecessors will also have suffered some dimensional error from wear alone, related to actual operation of the lock. When the cumulative dimensional error in the primary key as compared to the original key which came with the new lock exceeds a critical value, the next secondary key made, using present manufacturing methods, with the exception of manufacture by code, will not operate the lock operated by the primary key. In some cases special mechanical operations will salvage such a defective secondary key, although frequently it must be scrapped.

Thirdly, there is the problem of security. Very often when the primary key is given by the owner to a locksmith or conventional key maker at a key making facility, for purposes of manufacture of a secondary key, it leaves the direct sight and observation of the owner as it is taken by the operator to the location of the key cutting machine within the facility. In some cases the owner goes away from the facility for a period of time and later returns to pick up both keys, primary and secondary. In either of these circumstances, conditions permit an unscrupulous operator to make easily more than one secondary key which can then be used for improper or illegal purposes.

Thus, it can be seen that there is a need for an improved method of making keys having reduced cumulative dimensional error, inherently higher security, and capable of economical manufacture with a wide variety of decorative features. Furthermore, manufacture of decorated keys should ideally be capable of rapid and easy initiation by jewelers without requiring them to acquire conventional key making skills, equipment or supplies or any other significant skills, equipment or supplies not otherwise required in the conduct of their normal business.

SUMMARY OF THE INVENTION

The present invention provides a method and apparatus of key making which provides a solution to all of these problems.

A small and simply operated recording apparatus, employing an elastic pressure element is used to make a three dimensional recording in thin metallic foil from each of the two sides of the primary key from which a secondary key is to be manufactured. The operator of the recording apparatus need have no locksmithing skill, equipment, supplies, or knowledge of key making by present methods. The two recordings store in useful form all the precise three dimensional data from the primary key which are required by the method of the present invention.

The recordings are placed in an interpreting apparatus which employs an optical system and movable measurement stage to permit extraction of the precise three dimensional data from the primary key stored in the recordings, with a variable combination of operator and automatic action as may be desired. The interpreting apparatus need not be located at the same place as the recording apparatus and can be used to accept recordings from a plurality of recording apparatus at remote locations.

The data extracted by means of the interpreting apparatus is relative to three mutually orthogonal axes of the primary key and recordings and consist of alphanumeric characters manually or automatically printed on paper, and/or displayed visually and/or punched in paper tape or stored in coded form in another storage medium. The data are used to identify the key blank from which the secondary key is to be manufactured, the cutting wheel contour required for manufacture, and location of each element of the bitting of the key along the bit or working length of the secondary key (along the X axis) and its depth (along the Y axis).

The proper blank and cutting wheel, generally taken from available assortments at the location of the interpreting apparatus are mounted in a key cutting apparatus, generally at the same location as the interpreting apparatus in the central manufacturing facility. The cutting wheel is caused to rotate at the correct cutting speed by an electric motor. The data extracted in the interpreting apparatus are next used, with a variable combination of operator and automatic action as may be desired, to control the contact between the blank and the rotating cutting wheel in such a manner that the proper bitting is produced on the bit of the blank. When all required bitting has been cut, the blank has become the secondary key, which is complete and ready to function upon removal from the key cutting apparatus, deburring if required, and the addition of required decorative or ornamental features, if any. No adjustment or fitting to the lock is necessary.

The method of the present invention provides a number of advantages which are not available in presently used key manufacturing methods. These include the following:

1. the secondary key may be provided economically with decorative or ornamental features selected by the purchaser from a large available assortment kept in inventory at the central manufacturing facility;

2. access to the primary key is required only for a brief period (as compared to the longer time required by present methods, other than reproduction by code). Thus the purchase of a decorated secondary key can be as spontaneous, and as rapidly and easily initiated, as the purchase of any other standard jewelry item, particularly since the customer need not provide the jeweler with a "duplicate" key nor leave the primary key with the jeweler for addition of decorative features. No reference to the lock operated by the primary key is required;

3. the person, such as a jeweler, having brief access to the primary key need have no skill in, knowledge of, or equipment and supplies related to the making of keys by any present method;

4. the purchaser of the secondary key need have no knowledge of the making of keys by code or any other present method;

5. the secondary key is often a better key dimensionally than the primary key from which it is manufactured, rather than being a "duplicate" which may reproduce error due to wear and inexact prior manufacture of the primary key; and 6. the possibility of compromise of security of the primary and secondary keys is reduced as compared to the present methods.

In accordance with one embodiment of the method of the present invention, security is enhanced by having a clerk in the store to which the primary key is brought make the recordings on the sales counter in front of the customer so that the primary key is never out of the customer's immediate presence and observation. This is practical since the recording apparatus is small and its operation is clean and without hazard, as contrasted to the relatively dirty and hazardous operation of a conventional key cutting machine, which is also much larger and noisier. This constant visibility to the owner of activities involving his primary key virtually eliminates the possibility of independent improper activity by an unscrupulous clerk. The recordings are placed in a sealed package identified only by an order number, which package may be given to the customer to mail to the central manufacturing facility. Recordings arrive at the central manufacturing facility without any identity of the customer but with all required ordering information such as quantity, decorative features, and of course the order number. As a result, the possibility of independent improper activity by an unscrupulous person at the central manufacturing facility is virtually eliminated. After the secondary key has been manufactured it is sent to the ordering store in a sealed package with the order number written on the outside of the package. This allows the clerk to identify the customer upon receipt and to advise him to come to the store to pick up his key. The clerk does not open the package. Such is done only by the customer who at the time of purchase was notified not to accept an open package if he wished to avail himself of the maximum security features of the manufacturing method. The customer opens the package, inspects the key and takes it with him. Only through collusion between the clerk in the store and someone at the central manufacturing facility can security be breached. This is a circumstance offering much less opportunity for unauthorized activity than is turning over the primary key to a single individual for manufacture of a secondary key by present methods.

The method of the present invention also enhances key dimensional quality in certain cases, as noted above. Using the method of the present invention, dimensions of the original brand new key which came with the brand new lock can often be produced on the secondary key, permitting a whole new cycle of manufacturing and wear errors before an inoperative key is produced, in the event other keys are made from the secondary key using the manufacturing methods (other than by code) presently in use. The restoration of original dimensions can occur because the use of contoured templates in conjunction with an optically projected image of the foil recordings on a viewing screen of the interpreting apparatus often identifies the original contour of the bitting and yields data permitting its reproduction within functionally acceptable manufacturing tolerances.

The method of the present invention may be used with various high security keys such as those sold under the registered name "Medeco" in which the bitting is skewed from side to side to add another element of difficulty to unauthorized operation of the lock. With data from both sides of the key, as contained in the two foil recordings all required information for manufacture of secondary keys of this type is available.

The method of the present invention may be used to make secondary keys which register or locate in the lock at a shoulder or shoulders on the key near the handle as generally discussed herein, or to make secondary keys which register elsewhere, such as on the tip of the key.

BRIEF DESCRIPTION OF THE DRAWINGS

FIG. 3 is a perspective view of means for employing the recording means.

FIG. 5 is a detailed view of a portion of the recording apparatus of FIGS. 7, 8, and 8b.

FIG. 6 is a plan view of a key showing its characteristics.

FIG. 6a is a cross-sectional view of the key.

FIG. 7 is a perspective view of an alternate form of recording apparatus.

FIG. 8 is a perspective view of another alternate form of recording apparatus.

FIG. 8a is a detailed view of a portion of the recording apparatus of FIG. 8.

FIG. 8b is a perspective view of another alternate form of recording apparatus.

FIG. 8c is a cross-sectional view of a portion of the recording apparatus of FIG. 8b.

FIG. 9d is a block diagram illustrating printout and readout apparatus used with the device of FIGS. 9a–c.

FIG. 10 is an enlarged view of a portion of the image.

FIG. 11 is a typical template in the bit contour comparison template series.

FIG. 12 is a perspective view of one type of key cutting apparatus in accordance with the present invention.

FIG. 13 is an illustration of a key, similar to that of FIG. 9c showing the manner in which information obtained from the interpreting apparatus is used in cutting the secondary key on the apparatus of FIG. 12.

DETAILED DESCRIPTION OF THE INVENTION

The Recording Apparatus

Figure 1:
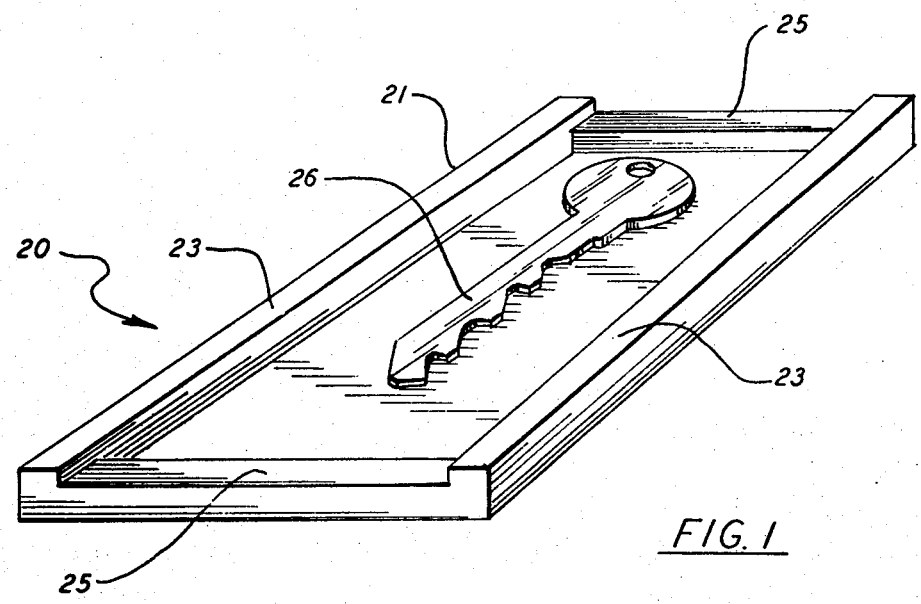
FIG. 1 is a perspective view of the recording means of the present invention, with foil removed to show its relationship to a key.
Figure 2:
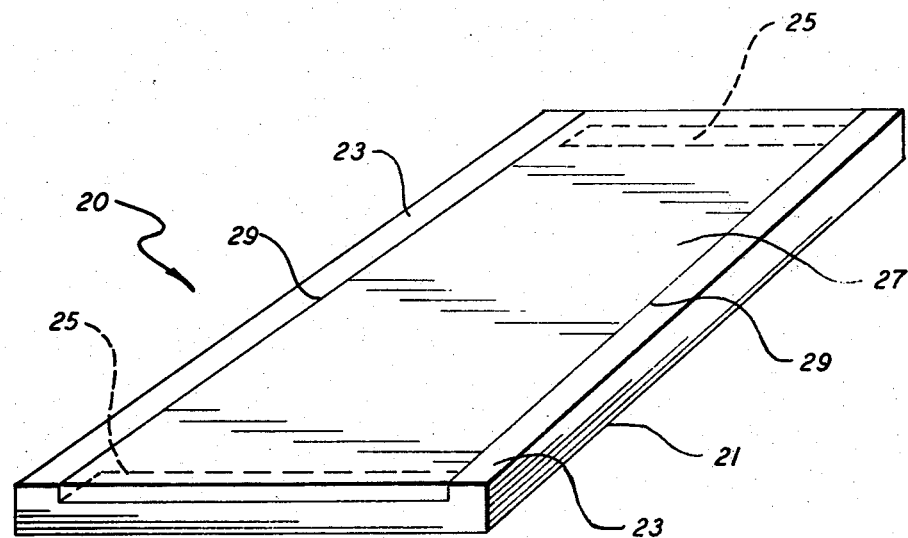
FIG. 2 is a similar view of the recording means including foil.

The basic elements of the recording means of the present invention are shown on FIGS. 1 and 2. The recording means indicated generally as foil assembly 20 includes a frame 21 having two side members 23 of a first height and two end members 25 of a smaller height. As shown by FIG. 2 a piece of foil 27 is cemented or otherwise attached to the frame end surfaces but is free of attachment along the edges 29. The difference in height of side members 23 and end members 25 is only a convenience for location of foil 27. Depending upon the foil used, cementing of foil to side members 23 instead of, or in addition to, end members 25 may occur. A type of foil which has been found to be particularly useful is 0.002" thick tin foil which has a satisfactory combination of strength and malleability.

The purpose of the recording apparatus is to support the key from which a recording is to be made in proper proximity with the foil assembly on which the recording is to be made so that a recording roller or the like may be caused to press the foil against the key for producing the recording of the key on the foil.

The interior dimensions of the frame 21 are such as to accommodate the largest key to be manufactured with space to spare all around. This relative size can be seen on FIG. 1 where a key 26 is shown. In cementing the foil 27 to the frame 21 a slight tension on the ends of the foil 27 is maintained so that in the completed foil assembly 20 the foil 27 is approximately in a plane parallel with the plane of the frame side surfaces 23. This is not critical but, for uniformity, variable foil sag is largely avoided by the application of the slight tension referred to. Alternatively a given amount of foil sag may be purposely introduced in cementing, depending upon the foil used.

A simple form of recording apparatus is that shown on FIG. 3 in which the frames of foil assemblies 20 and 20A (not identical in this instance) such as that of FIGS. 1 and 2 are molded as one piece in plastic and hinged together by an integral plastic hinge or hinges 30.

Foil assembly 20 has foil from point 1 to point 2 while foil assembly 20A has foil from point 3 to point 4. Key 26 is placed on surface 5 of the frame of foil assembly 20 engaging pin 6 for approximate positioning. Foil assemblies 20 and 20A are closed and snapped or otherwise secured in the closed position by means of molded-in fastener 7. With thumb and finger of one hand the operator squeezes the handle portion of key 26 between surface 5 and the foil of foil assembly 20A so that the bitting of key 26 is securely cantilevered from surface 5 and lies between the inner surfaces of the two pieces of foil. Thumb and finger of the other hand are used as the elastic pressure element in this instance, to press the foils against their respective sides of key 26 and against each other, creating two recordings. In squeezing the handle portion of key 26 between surface 5 and the foil of foil assembly 20A a recording is made in the foil of foil assembly 20A of the surface of the handle portion of key 6 and the top of pin 6. Since the height of the top of pin 6 above surface 5 is known, the thickness of key 26 can be determined by comparison of the heights in the recording of pin and handle elements. Thickness indicating surfaces other than the top of pin 6 can also be molded in the plastic frames. Furthermore, foil assembly 20A may be provided with an elastic pressure pad between its plastic frame and the outer surface of its foil, conforming approximately to the shape of surface 5, so that when the two foil assemblies 20 and 20A are secured in the closed position the handle portion of key 26 is automatically squeezed against surface 5 and the bitting properly cantilevered by this means rather than by pressure of thumb and finger as previously described. Key 26 may also be supported by clamps, spring clips, and many other common methods. Additionally, recordings may be made by a hand operated elastic roller or the like rather than by thumb and finger. When the recordings have been produced in this manner, the foil assemblies are opened and key 26 is removed and returned to its owner. The foil assemblies containing the recordings are then closed and transmitted to the key making facility.

From the discussion so far, it is evident that recording can be carried out in many different ways. A number of additional exemplary embodiments of types of recording apparatus will now be described. As will be evident operation may be manual, semi-automatic or completely automatic depending on particular requirements.

Figure 4:
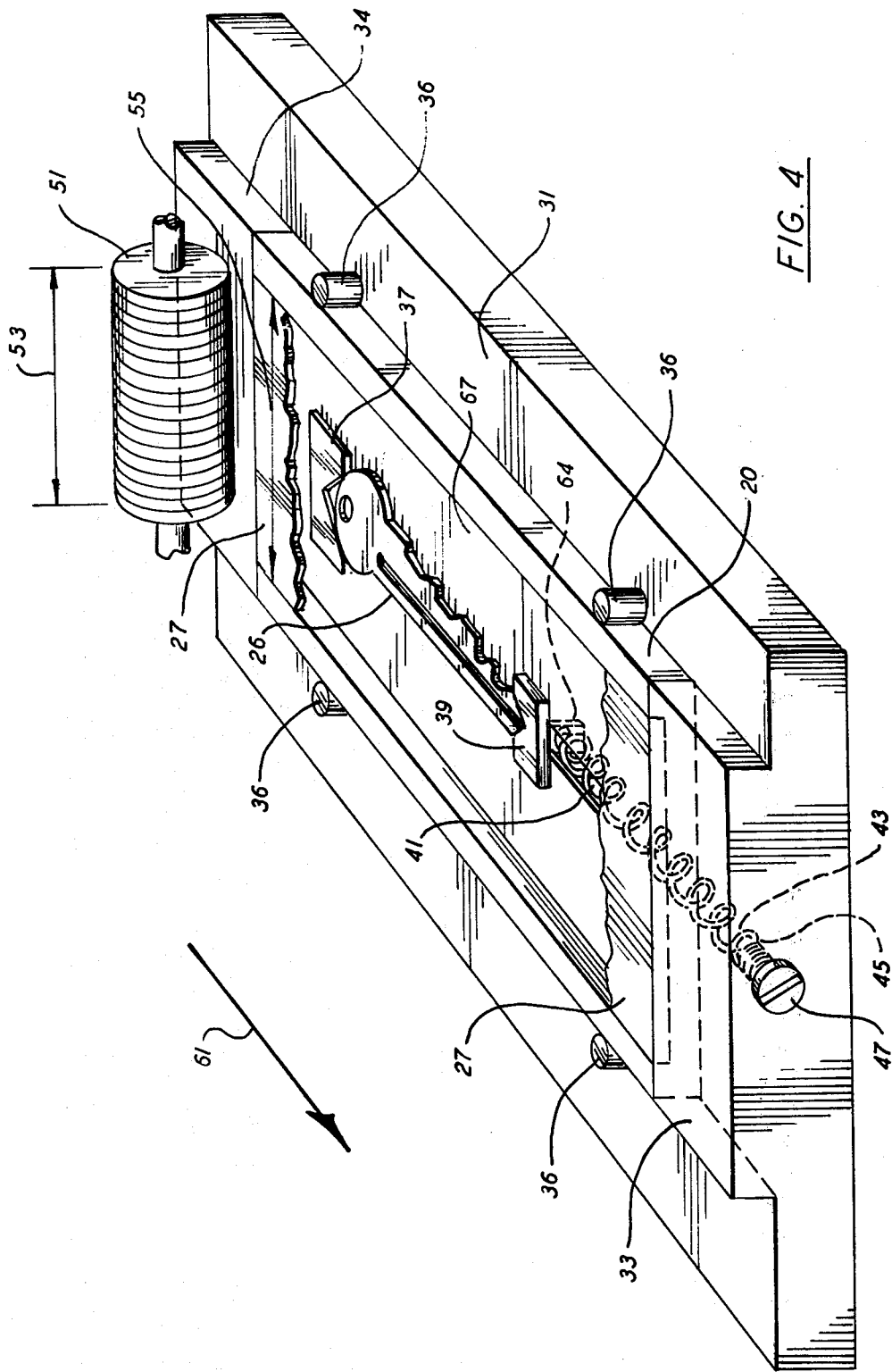
FIG. 4 is a perspective view of a portion of the recording apparatus of FIGS. 7 and 8, using recording means such as that shown in FIGS. 1 and 2.

FIG. 4 illustrates a portion of an apparatus according to the present invention which may be used for recording. This apparatus utilizes the foil assembly 20 described above in connection with FIGS. 1 and 2. In this drawing, the foil 27 is shown broken away so that the key 26 is visible. As illustrated, the apparatus includes a support 31 having two raised areas 33 and 34 spaced apart a distance equal to the length of the foil assembly 20. Also disposed on the support are four posts 36 in pairs with a spacing equal to the width of the foil assembly 20. As illustrated the foil assembly 20 is inserted between the posts 36 and the raised portions 33 and 34. Mounted on surface 67 of the support 31 is a fixed stop 37 against which the handle of the key 26 abuts. For holding the key an additional movable stop 39 is provided. The movable stop 39 has a downwardly depending projection 64 which rides in a slot 41 in the support 31. A bore 43 is formed through the end of the support 31 and a spring 45 inserted to bias the movable stop 39 toward the fixed stop 37. Suitable fastening means 47 are disposed in the end of the support 31 to retain the spring 45. For example, the bore may be threaded and the means 47 a threaded plug. In inserting the key, the movable stop 39 is slid back, the key placed on surface 67 with its handle against the fixed stop 37 and the movable stop 39 brought into contact with the other end of the key.

The raised portions 34 and 33 may be termed a starting block and runout block respectively. Their height is approximately equal to that of the foil assembly 20. Disposed at the starting block 34 is shown a recording roller 51 having a width 53 less than the inside width 55 of the frame of foil assembly 20. (This width restriction does not apply in certain other designs of foil assembly and support surfaces such as described in connection with FIGS. 8b and 8c. The means by which recording roller 51 is caused to exert pressure on starting block 34 and other elements of FIG. 4 are not shown in FIG. 4.

The detail of the roller 51 is illustrated on FIG. 5. The roller includes a shaft 56 on which are disposed a plurality of segments 57 of an elastic material. The segments 57 are restrained by end pieces 59. Referring again to FIG. 4, the roller 51 starts out from the position shown and is moved in the direction of the arrow 61 from the starting block 34 to the runout block 33. As it moves over the foil 27 disposed over the key 26 it makes a recording on the foil as is shown on FIG. 5. Note that the elastic segments 57 press the foil 27 down around the sides of the key and also press it into the warding groove 63 of the key (FIG. 5). Similarly, it will press the foil around each of the bits in the key. Depending upon the elastic material of the roller, a solid elastic rather than segmented elastic roller may be employed.

At this point, the various features of a key might well be explained. A typical key is shown on FIG. 6. The key 26 includes a handle 65 from which the bitting or working portion 200 of the key extends terminating in a tip 69. In one or both sides of the key one or more warding grooves 63 are formed. The bitting of the key begins at a shoulder 71. The illustrated key has four bits designated 191, 201, 202 and 203. In each bit, the portion 73 is termed the side of the bit and the portion 75 the bottom of the bit. The bottom of bitting 200 is shown as element 192. FIG. 6a illustrates a cross section through the key illustrating the manner in which the warding groove 63 is cut.

Returning to FIG. 4, as the recording roller 51 moves in the direction of arrow 61 it makes a recording of the key 26. It will also make a recording of the fixed stop 37 and movable stop 39. In the case of thin keys, the foil may be pressed down upon the surface 67 and record that surface including projections which may be provided thereon for purposes of key thickness measurement.

Once a recording is made from one side of the key, the recording roller 51 now being at the runout block 33, the foil assembly 20 with the recording thereon is removed from the support 31. The key 26 is removed from between the stops 37 and 39 and is turned over and replaced between the stops. A second foil assembly 20 is put into place and the recording roller moved over the foil 27 to make a recording of the second side of the key. This may be done on the return stroke of the recording roller 51 from the runout block 33 to the starting block 34 or alternatively the recording roller 51 may be returned to the starting block 34 before installation of the second foil assembly 20 and moved in the direction of arrow 61 for the second recording as for the first.

As noted above, it is possible to use manual, automatic, or semi-automatic recording means. FIG. 7 illustrates an embodiment of manual apparatus for carrying out the present invention. In this embodiment the recording roller 51 is disposed in a hand tool designated generally as 81. The hand tool includes a handle 83 attached to the top of a U-shaped member 85. The support 31 is formed with spaced parallel grooves 87 therein. Disposed at the bottom of the sides of the U-shaped member 85 are rollers 89 having shafts 91 supported within the U-shaped member 85 for rotation. These are spaced apart so as to mate with the grooves 87 in the support 31. The recording roller 51 is supported in a second smaller U-shaped member 93 having disposed therein suitable bearings 95 to support the shaft 56 of the recording roller 51. The member 93 is attached to the member 85 by means of a flexible element 97 which is attached to the respective members utilizing fastening means, e.g., screws 101 and 103. The construction of the support 31 with the starting block 34 and runout block 33 is as described in connection with FIG. 4.

To make a recording with this two piece recording apparatus of FIG. 7, the key and foil assembly are disposed on the support 31 in the manner described above. The rollers 89 are placed in the grooves 87 with the recording roller 51 disposed over the starting block 34. The handle 83 is held by the operator such that its longitudinal axis 84 is approximately parallel to the sides 88 of the support 31 and such that it makes approximately a 45° angle (or such other angle as may be designed in) with the foil. As an alternative, a second set of rollers on frame 85 or guides operating in the grooves 87 can be utilized to establish the required angle automatically. The operator exerts a downward pressure on the hand tool so that the rollers 89 press firmly into the grooves 87 and moves the hand tool 81 from the starting block 34 to the runout block 33 as indicated by arrow 61. As this motion occurs the recording is made. The flexible member 97 is selected so that when the tool is held in the described position, with the rollers 89 firmly in the grooves 87, the proper recording roller pressure is exerted on the foil assembly and key.

When the hand tool 81 has been moved to the runout block 33, it is removed from the support 31 and set aside. The foil assembly with the recording thereon is removed, the key turned over and another foil assembly put in place. A second recording is then carried out in the same manner. As an alternative, the hand tool rather than being a separate piece can be constructed so as to be retained on the support and capable of being moved back and forth thereon.

FIG. 8 shows an alternative embodiment of the present invention which is semi-automatic in nature. In this embodiment details of the support 31 for retaining the foil assembly 20 are not shown. Construction of this portion will be the same as described above in FIG. 4. In this embodiment the support 31 is at the top of a U-shaped member having extending flanges 105. On each side a roller track 107 is provided. The roller track is secured to the flanges 105 by fastening means 109, e.g., screws.

FIG. 8a illustrates a cross sectional view of this portion of the device. Shown is the flange 105 and the roller track 107 along with the fastening means 109. The roller tracks 107 are used for guiding a carriage 113. Carriage 113 includes two sides 115 connected by a top piece 117 which forms a handle. Disposed at the bottom of each of sides 115 are a pair of shafts 119 having mounted on the end thereof rollers 121 and 123. As illustrated by FIG. 8a the rollers ride in slots 125 in the tracks 107 and on the flanges 105. The recording roller 51 (shown in alternate solid elastic rather than segmented elastic configuration, as noted earlier) is supported between the two sides 115. As in the embodiment of FIG. 7, it is supported within a U-shaped member 93 with its shaft 56 disposed in bearings 95 contained within the two arms of the U-shaped member 93. U-shaped member 93 is supported by flexible member 127 using suitable mounting means 129. Flexible member 127 is attached by mounting means 131 on the other end to a cross piece 133 extending between the two sides 115. An adjustment screw 135 extending from the top 117 and contacting the flexible member 127 permits adjusting the pressure of the recording roller 51 on the foil. As noted, the top piece 117 of the carriage forms a handle which can be grasped by the operator. The carriage 113 is biased toward the starting block end of the device by means of spring 128 extending between the carriage 113 and a fastening means 137 attached to the support 31. Spring 128 is attached to carriage 113 by fastening means 42. A starting stop 139 is disposed on each of the flanges 105 (at the starting block end) to define the starting position of the carriage. Similarly, stops 141 are disposed on the opposite end (runout block end) of the flanges 105 to limit carriage motion in the direction 61 of recording. At one end of the roller tracks 107 are disposed ramps 143. These are attached to the top of the tracks 107 by hinges and are spring biased in the down position. As the carriage 113 moves in the direction of the recording 61 up against the stops 141 the rollers 121 (one on each side) push the ramps up and continue moving past the edge of the ramps 143 which then return to the position shown on the figure. This provides ramps for the rollers 121 on their return trip to the starting position, which takes place on top of tracks 107. Another set of hinged ramps 143A, spring biased in the up position (but shown in the down position) attached at their forward ends to the tracks 107 are utilized, along with a cam 145 which cooperates with a cam pin 147 on the carriage to return the rollers 121 to the inside of the tracks 107. This can be best understood through an explanation of the operation. The foil assembly 20 and key 26 will be placed on the support 31 in the manner described above, the spring 128 will be biasing the carriage against the stops 139 with all four rollers 121 and 123 inside the tracks 107. When a recording is to be made, the operator grasps the handle 117 and moves the carriage in the direction shown by the arrow 61. As the carriage approaches the stops 141, the two rollers 121 push up the ramps 143 and eventually come out from beneath them as the carriage runs up against the stops 141. The operator then releases the carriage and the spring force exerted by the spring 128 pulls the carriage back toward the starting position. The rollers 121 run up on the ramps 143 and ride along the top of the tracks until the cam pin 147 encounters the cam 145 attached to the side of the track 107. Upon engagement of cam and cam pin, the rollers 121 move downward pushing down ramps 143A and returning to the inside of the tracks 107 in readiness for another recording cycle. This action raises recording roller 51 and insures that only during the forward cycle will the pressure of the recording roller 51 be applied to the foil. This is desirable in certain cases depending upon the foil used. The spring 128 continues to move the carriage with the rollers 121 now inside the tracks, until the carriage 113 comes up against the stops 139.

A preferred embodiment of the recording apparatus of the present invention is shown in FIG. 8b in which support 310 contains a foil assembly locating groove or recess 300 of a generally rectangular shape into which the foil assembly (omitted from FIG. 8b for clarity) fits. Foil assembly locating groove 300 is disposed on all four sides of key mounting surface 301 on which key 26 rests. Retractable pin 303 provides approximate location for key 26 as the latter rests on key mounting surface 301, doing so by engaging the normally present hole in the handle of key 26. Surfaces 304 and 305 of support 310 are coplanar, or nearly so, with key mounting surface 301. Ramp surface 306 provides an inclined plane for recording roller 51 as described below.

Details of the above noted portions of support 310, together with a foil assembly 20 are shown in FIG. 8c wherein foil assembly 20, consisting of foil 27 and frame 21 (as in FIGS. 1 and 2) is positioned for recording, over key 26 and in foil assembly locating groove 300 of support 310. Retractable pin 303 is biased in the upward direction by spring 307 which is retained within support 310 by threaded plug 308. Surfaces 301, 304, 305, and ramp surface 306 are disposed as shown in relation to foil assembly 20, prior to recording (FIG. 8c).

Referring again to FIG. 8b, there is shown carriage 309 having two sides 311 at the bottom of each of which there is fixed a stub shaft 312 supporting a roller 313, (two such rollers in all). On one side 311 there is also disposed pin 314 which projects from the inside surface of that side 311 and engages slot 315 in the side of support 310. Recording roller 51, shown in alternate solid elastic rather than segmented elastic configuration, is supported on shaft 56 and bearings 95, the latter within U-shaped member 316. Flexible member 317 is supported at one end on carriage cross member 318 by attachment means 319, and at its other end supports U-shaped member 316 by attachment means 320. Starting-end stop 321 and runout-end stop 322 limit the extent of carriage 309 travel along the length of support 310. Leg portions 323 and 323a of support 310 may rest on any approximately flat work surface (not shown) and are of such dimension that carriage 309 remains clear of that work surface as it traverses within the limits established by the locations of stops 321 and 322.

Recording is accomplished as follows. Referring to FIG. 8b, with carriage 309 at the starting-end of support 310 (the end opposite to that in which, for clarity, it has been shown) and up against starting-end stop 321, key 26 is placed in position and foil assembly 20 (FIG. 8c) is placed around and over key 26, being located in foil assembly locating groove 300. Recording roller 51 is part way down ramp surface 306 and flexible member 317 is in an unflexed condition. To initiate the recording, handle 324 of carriage 309 is grasped in one hand by the operator and carriage 309 is moved in the direction of arrow 61, with motion of support 310 restrained by having the other hand grasp the upper portion of leg 323, which provides a handle. As this occurs, recording roller 51 ascends ramp surface 306 causing flexible member 317 to flex, resulting in a downward force acting upon recording roller 51.

Referring now to FIG. 8c, recording roller 51, moving in the direction of arrow 61, ascends ramp surface 306 to surface 304, then pushes down that portion of foil assembly 20 which extends above surface 304 (for which room has been provided in the depth of foil assembly locating groove 300) and continues on to press foil 27 against and around key 26, making the recording. Just before recording roller 51 encounters surface 305 it will again push down foil assembly 20 should any portion thereof extend above surface 305 at that point in the cycle.

Referring again to FIG. 8b, motion of carriage 309 is continued until it encounters runout-end stop 322. Using finger grip slots 325 in support 310, foil assembly 20 and key 26 are removed from support 310 and carriage 309 is returned to its original starting point. Key 26 is replaced on key mounting surface 301 with its second side up and a second foil assembly 20 is put in place. The second recording is made by repetition of the procedure above described. Recording of optional projections 326 from key mounting surface 301 serves to stiffen the foil and aid in key thickness determination when employed. Recording of optional projections 327 serves to aid in key thickness determination when employed. One or the other of this general type of projection is desirable for key thickness determination.

A second ramp surface may also be provided at the runout-end of support 310 in the event carriage 309 may be stored at that location between periods of use, in which case flat spots on recording roller 51 which otherwise might occur during storage are avoided since there would be no downward pressure on recording roller 51 as flexible member 317 would be unflexed with the second ramp present.

Since retractable pin 303 will be pushed flush with key mounting surface 301 against its spring bias when encountered by recording roller 51 on its return stroke without key 26 in position, it will not dig into recording roller 51 even after repeated cycles, and recording roller 51 life will be lengthened.

If desired, the second recording may be made in the opposite direction to the first, rather than in the same direction as described.

Carriage 309 may be provided with a thin cover all around, to protect its components.

INTERPRETING APPARATUS

Figure 9A:
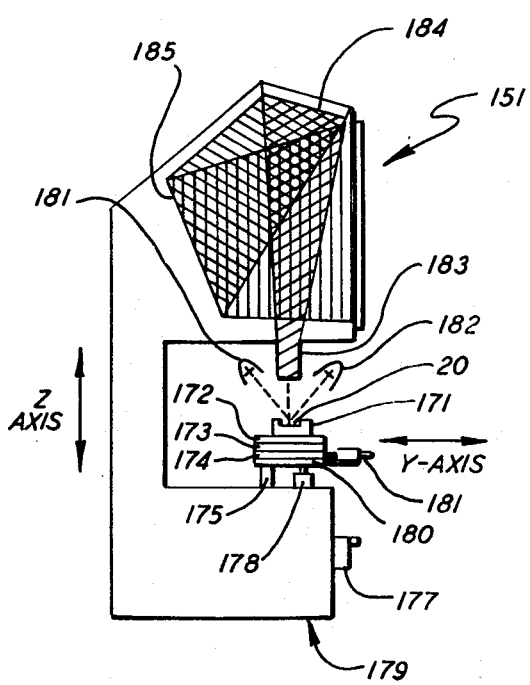
FIG. 9a is a side elevation view of interpreting apparatus according to the present invention.
Figure 9B:
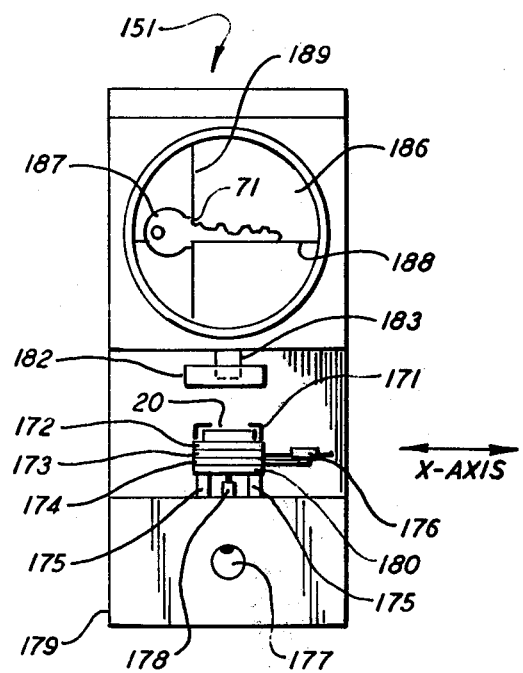
FIG. 9b is a front elevation view of the interpreting apparatus.
Figure 9C:
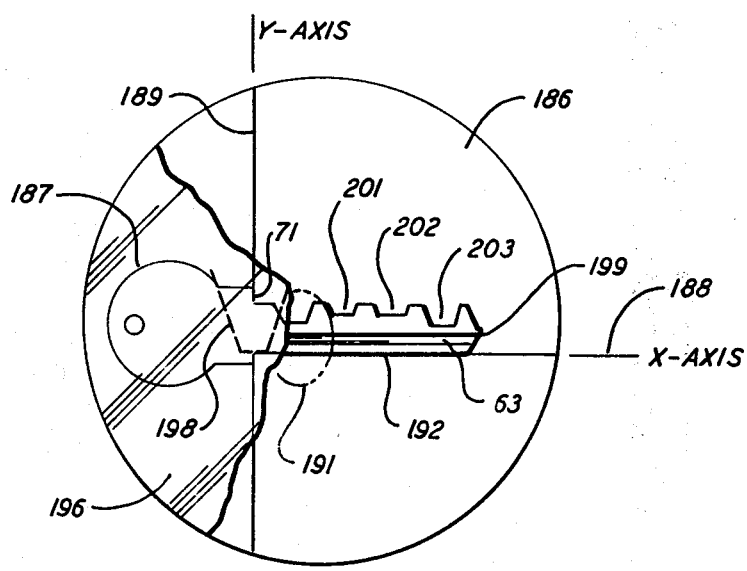
FIG. 9c is a view of the screen of the apparatus of FIGS. 9a and b, showing image and template.

FIGS. 9a, b, and c illustrate a type of interpreting apparatus which can be used with the present invention. The function of the interpreting apparatus is to afford a means of extracting from a set of two recordings made from a given primary key all the precise three dimensional data required to permit cutting a secondary key on key cutting apparatus, being in effect a key decoding device. Any number of mechanizations can be used. However, the apparatus described on FIGS. 9a–c is particularly well suited for this purpose. Shown on FIGS. 9a–c is a recording magnification and projection unit 151. In conjunction with this device, in order to get the necessary data, a data readout system and a bit contour comparison template series are also required as will be described in more detail below.

The recording magnification and projection unit of FIGS. 9a–c accepts on its movable measurement stage a foil assembly on which a recording has been made. From this, it produces a magnified image of the recording indicative of the dimensions of the primary key from which the recording was made and which are required for making the secondary key. It projects the magnified image on a measurement screen for measurement utilizing the bit contour comparison template series. A typical unit which may be used for this purpose is a Wilder Varibeam Micro Projector manufactured by R. S. Wilder, Inc., Waltham, Mass. Such an apparatus is shown on FIGS. 9a and b in side and front views respectively. It will be described only in sufficient detail to understand how it relates to the present invention. The foil assembly 20 containing the foil with the recording of the primary key thereon is held by fastening means 171 to a rotational stage element 172 which is supported upon an X axis stage element 173 which is in turn supported upon a Y axis stage element 174. The Y axis stage element 174 is supported on a basic work surface 180 mounted on two support columns 175 which are movable along the Z axis. X and Y axis stage motion is accomplished and measured by means of two precision digital positioners, for example, the type of positioners made by IKL, Inc., Newport Beach, California. One operates on each of the X and Y axes. The X axis precision digital positioner 176 (FIG. 9b only) is mounted on the Y axis stage element 174 and bears on the X axis stage element 173. The Y axis precision digital positioner 181 (FIG. 9a only) is mounted on the basic work surface 180 and bears on the Y axis stage element 174. Z axis stage motion is accomplished by means of a focus control 177 and is measured by means of a Z axis digital dial indicator 178 mounted on frame 179 and having a measurement stylus bearing upon the underside of the basic work surface 180. Precision digital positioners 176 and 181 and the digital dial indicator 178 are parts of the data readout system of the interpreting apparatus and will be described in more detail below. The capability for Z axis measurement is a modification of the standard device made by Wilder.

Light sources 182 direct light to the surface of the foil assembly 20 which is reflected into a lens system 183 and to mirrors 184 and 185 in turn. A magnified image 187 of the surfaces of the recording on foil assembly 20 is projected on a screen 186. The screen contains a horizontal reference line 188 and a vertical reference line 189. The degree of image magnification is determined by the optical components of the lens system 183. The location of the light source in the present invention deviates from that of the standard Wilder device although the standard light source location may also be used. Proper adjustment of light sources 182, focus control 177 and the various stage elements results in an image on screen 186 as shown on FIGS. 9b and c. In accordance with the present invention, the bottom 192 of the image 187 is aligned with reference line 188 and the shoulder 71 of the image 187 is aligned with the vertical reference line 189 on screen 186. In the case of a key which is double bitted, i.e., bitting on both top and bottom and thus which has no straight bottom 192 alignment of the horizontal reference 188 is made with one of the warding grooves 63 or other parts of the image rather than with bottom 192, and evident procedural changes are made. The position shown on FIG. 9c is considered to be the zero image position and at that point both the X and Y digital positioners are zeroed. Movement of the X axis digital positioner 176 causes the image 187 to move horizontally along horizontal reference line 188. Motion of the Y axis digital positioner 181 causes the image 187 to move vertically along the vertical reference line 189. Through these two movements a finite X and Y value for any point on the key image may be obtained. As shown on FIG. 9d, the output of the X axis digital positioner 176 is coupled as an input to a line printer 221X and to a digital readout 223X. Similarly, the Y axis digital positioner 181 has its output coupled to a line printer 221Y and to a digital readout 223Y. The Z axis digital dial indicator 178 is coupled to a line printer 221Z and to a digital readout 223Z. A foot switch 225 issues a print command to the X and Y line printers. A second foot switch 227 issues a print command to the Z line printer. The necessary zeroing described above can be accomplished either mechanically at the devices 176, 178 and 181 or electrically at the readouts 223X, Y, and Z and electrically at the printers 221X, Y and Z. Binary coded decimal (BCD) electric outputs are also provided as indicated in FIG. 9d.

FIG. 10 illustrates an enlarged portion of the image 187 of FIG. 9b and c. One of the bits 191 encircled on FIG. 9c is illustrated. FIG. 11 illustrates a bit contour comparison template 196 and its bit contour 195 drawn thereon. A number of such templates are provided for purposes of comparison with images. The operator after projecting a recording image on the screen, selects, via observation, comparison and trial, one of the templates which will match the bit contour of the image on the screen. It should be noted that there are only a limited number of bit contours on the bitting of keys, which is what permits making keys by code, one of the present key making methods referred to earlier. The bit contour comparison template series consists of a finite number of bit contours drawn on thin transparent plastic overlays which can be placed over the screen 186 of FIGS. 9b and c for comparison purposes. One or more contours may be placed on a given piece of plastic as is deemed convenient for use by the operator of the interpreting apparatus. Each may contain one or more reference lines such as line 194. In selecting the template of FIG. 11 as the matching one, the operator will note that the angles 205 and the dimension 193 of the bottom 197 most closely match the same portion of the bit image of FIG. 10. It should be noted that the other templates would have different contours, with some templates having curved contours in part or entirety. Line 194 is the center line for the bit contour 195 of template 196.

The data required for preparing the various templates of the bit contour comparison template series are available in the manuals of the locksmithing profession, generally put out by manufacturers of locks, keys, and key blanks. In the event an unknown contour is encountered on a bit image from a recording from a particular primary key, a template can be prepared from it, along with a corresponding milling cutter. It may be used thereafter as part of the bit contour comparison template series. As will be seen below, each bit contour has a matching milling cutter associated with it which is used in the key cutting apparatus to cut that particular bit contour on any secondary key requiring it.

Having selected the template 196 of FIG. 11, it is placed (overlayed) on the screen 186 of FIG. 9c as shown so that the vertical center line 194 is coincident with the vertical reference line 189 on the screen 186 and so that the bit contour bottom 197 is coincident with horizontal reference line 188. Bit contour 195 of template 196 is then in position as indicated by dash line contour 198 of FIG. 9c. Readouts and printers are zeroed, the X axis digital positioner 176 and Y axis digital positioner 181 are operated so as to move the contour of the bit 191 image into coincidence with the bit contour 195 on template 196 in its overlay position 198 on the screen. When coincidence is achieved the reading on the X axis digital positioner represents the X axis position of the center line of bit 191 from the shoulder 71 of primary key and image and the reading on the Y axis digital positioner represents the Y axis position of the bottom of the bit 191 from the bottom 192 of primary key and image. These two position numbers may be printed out by actuating the foot switch 225 of FIG. 9d.

One at a time in turn the contours of the other three bit images 201, 202, and 203 are brought into coincidence with the template contour shown as dash line contour 198, and a set of X and Y axis position numbers is obtained for each by repetition of the procedure described above for causing coincidence of bit image 191 with the dash line contour 198. The image 187 shown in FIG. 9c is of a recording made from a primary key having four bits in its bitting, with lock registration on the double shoulder 71.

If the primary key had been one registering in the lock on its tip, the tip rather than shoulder 71 would have been used in the measurement procedure described above.

Since two recordings were made from the primary key, one from each side, the X and Y position numbers for the bit are determined as described above, from the one of the images which by visual observation most clearly and sharply reproduces the configuration of the bitting of the primary key in the event that both recordings do not do so equally as sometimes may be the case. Occasionally, some position numbers may be taken from one recording and some from the other.

A given bit contour drawn on a given template such as the bit contour 195 of FIG. 11 drawn on template 196 is drawn to represent the deepest bit using that contour. Therefore, when coincidence of a bit contour of a template with a bit image of a recording is spoken of this means that the bottoms of both are made to coincide as are the sides of both adjacent to the bottom. Coincidence length along the sides of a bit contour of a template and bit image will depend upon the depth of the particular bit on the primary key and recording and the corresponding bit image.

Using the above prescribed procedure, X and Y axis position numbers are printed out for each of the four bits of the image 187 of FIG. 9c. Before this data may be used to cut the corresponding bits on a secondary key using key cutting apparatus, the key blank to be used must be identified. In present key making methods, blank identification is generally done by a locksmith or key maker using a visual, manual inspection and observing the primary key for its active length from shoulder to tip, height, thickness and the location, shape and dimensions of the various warding grooves (including the runout area thereof, at the handle end) which may be present on one or both sides, as well as by means such as alpha-numeric information coded or uncoded which may be contained on the primary key. This information is compared with key blank drawings and listings and with various actual blanks and other data available in the literature and trade manuals of the locksmithing profession. This permits proper blank identification.

The present invention utilizes this same method of identifying a blank, utilizing instead of the primary key the recording thereof. In addition, X, Y and Z measurements of the overall and warding dimensions of a given recording are made using the X and Y digital positioners and the Z axis digital dial indicator if required. In the latter case, by zeroing the Z axis digital dial indicator and printer when the uppermost plane of the recording is in sharpest focus on screen 186 and then focusing successively on the other planes of the warding and printing out the Z axis data by means of the foot operated Z axis print switch, some or all of the several warding planes normal to the Z axis which may be present in a given primary key may be precisely located along the Z axis and relative to each other. Similarly the thickness of the primary key and therefore the thickness of the blank from which the secondary key is to be made may be determined by focusing on the uppermost plane of a given recording, zeroing the Z axis digital dial indicator and printer and then focusing on the uppermost plane of the fixed stop 37 of FIG. 4 as repeated in the recording and/or the uppermost plane of movable stop 39 as represented in the recording and/or the uppermost plane of other surface(s) provided for key thickness determination, as such surface(s) are represented in the recording. Since the uppermost planes of both stops are known distances above the surface 67 of FIG. 4, depending on the specific design of the recording apparatus, and since the uppermost plane of the primary key at the time the recording was made was above surface 67 by the thickness of the primary key, this Z axis data permits calculation, by addition or subtraction, of the thickness of the blank to be used. Overall dimensions along the X and Y axis are determined in a similar manner to that employed to obtain X and Y axis position numbers for the bits, zeroing at one dimensional extreme and printing out at the other using the digital positioners to move the recording beneath the lens system, thus moving the recording image on the screen correspondingly with respect to the screen reference lines.

In this manner the proper blank is identified and the next step of the present invention, i.e., cutting the secondary key on a key cutting apparatus may be carried out.

KEY CUTTER

The key cutting apparatus is shown on FIG. 12. It includes a base plate 210 on which is mounted a milling cutter electric drive motor 211. Also mounted thereon are milling cutter support bearings 212, X axis positioning rails 213 and X axis position digital dial indicator 214. An X axis sliding plate 215 is supported by the X axis positioning rails 213. Y axis positioning rails 216 and a Y axis position digital dial indicator 217 are mounted on the X axis sliding plate 215. A Y axis sliding plate 218 is supported by Y axis positioning rails 216. A key blank holding fixture 219 is mounted on the Y axis sliding plate 218. This is located in a position adjacent to the identified and selected milling cutter 220 on a shaft 233 which is supported in suitable bearings in the supports 212. On the end of the shaft 233 is a pulley 229 which is driven by a belt 222 coupled to another pulley 231 on the end of the shaft of motor 211. The digital dial indicators 214 and 217 may be the type manufactured by IKL, Inc. and each are connected to a readout, not shown, similar to the readouts 223 described above.

FIG. 13 illustrates a key blank 224 (after cutting) disposed in the fixture 219. X axis sliding plate 215 and Y axis sliding plate 218 are positioned along their respective positioning rails by lead screws or other conventional means not shown. The key blank is disposed firmly against X axis reference surface 225 of fixture 219 and Y axis reference surface 226 of fixture 219. The surface 225 abuts against the shoulder of the blank and the surface 226 abuts against the bottom of the blank. The X axis position digital dial indicator 214 is adjusted to read zero when the center line of the cutting edge of the milling cutter 220 is in the same position along the X axis as is the X axis reference surface 225. The Y axis position digital dial indicator 217 is adjusted so as to read the known distance between the cutting edge on the periphery of the milling cutter 220 nearest the blank to be cut and Y axis reference surface 226 of the blank holding fixture 219 measured in a plane normal to the Y axis reference surface 226 and normal to the rotational center line of the shaft 223. Y axis position digital dial indicator 217 would read zero when the cutting edge on the periphery of milling cutter 220 just touched Y axis reference surface 226 of fixture 219. The measurements shown on FIG. 13, i.e., $X_1$, $X_2$, $X_3$, $X_4$ and $Y_1$, $Y_2$, $Y_3$, and $Y_4$ represent the X and Y data obtained from the recordings. These are the position numbers referred to previously. Using this information the contour shown can be cut. FIG. 13 shows the same bitting as is shown on FIG. 9c. The X axis sliding plate 215 of FIG. 12 is positioned so that the X axis position digital dial indicator 214 reads the value $X_1$. Then the Y axis sliding plate 218 is gradually positioned so that the Y axis position digital dial indicator 217 reads $Y_1$. As the Y axis sliding plate 218 is gradually positioned, milling cutter 220 will engage key blank 224 and cut the proper bit shape in the proper place and to the proper depth. The milling cutter 220 is that one of the available assortment of milling cutters determined to be correct when data was taken in the interpreting apparatus as described earlier i.e., it will correspond to the identified bit contour. Once the bit closest to the shoulder of the key blank 224 has been cut, the Y axis sliding plate is retracted so that the milling cutter 220 is clear of the key blank. The other three bits between the one already cut and the tip of the key blank are then cut by repeating the procedure just described, i.e., by positioning the cutter along the X axis to their X axis position number and moving the Y axis plate 218 until their Y axis position number is reached. Slight machining in the shoulder or tip areas of the key blank which may be required in certain cases is accomplished by similar methods.

Key blank 224 of FIG. 13, which has now become the desired secondary key, except for any ornamentation required, is removed from the key blank holding fixture 219, deburred if required, and is ready for ornamentation. Different key blank holding fixtures may be required for different blanks.

In addition to the specific embodiments of the method and apparatus described above, various modifications are possible. For example, although metallic foil has been described as the preferred material for making the recordings, thermoplastics or other deformable plastics or other material may be used as the medium on which the recording is made rather than metallic foil. In such a case the recording roller may be heated to facilitate recording with certain materials.

Furthermore, the primary key need not be placed longitudinally in the recording apparatus when recording is done but may be placed, one side down at a time, in any position relative to the motion of the recording roller. The fixed and movable stops holding the primary key may be interchanged in position and are not necessary if the primary key is held by other means such as sticky tape or a pin. Furthermore, the carriage may be moved in other manners than on rollers and may be motor driven. In addition, the recording may be made by straight line application of pressure normal to the foil or other material by some other elastic pressure element than a recording roller, such as a solid or segmented elastic pressure pad, wherein one or both sides of a primary key is/are recorded all at once rather than progressively as with a recording roller. As the recording of the primary key is made, other recorder surfaces adjacent thereto may also be recorded, to stiffen the foil or other material for better handling and better measurement accuracy. The various apparatus shown may be modified so that both recordings are made simultaneously rather than sequentially. The recording may be used as a mold into which plaster, plastic or other setting material is poured. The contour of the primary key reproduced in the mold may be copied by any contour reproducing device such as an ordinary key making machine.

An optical servo system may be arranged to null on the reflected light from the contour of the recording directly or on the contour of the image on the screen and cause the driving of a cutting machine reproducing the required bitting on the secondary key. A copy such as a plain paper copy may be made of the image on the screen and used with an optical servo system to carry out the cutting. The use of templates and contoured milling cutters could be eliminated by taking X and Y axis position number measurements from many more points on the contour of the image and cutting the secondary key on a point to point basis. The interpreting apparatus may be used as a decoding device, as noted earlier, and the secondary key may be cut in a conventional code key cutting machine as if the code had been made available by any other means. (In some cases the recording will contain the code number of the key directly in alpha-numeric form). The image on the screen or a copy made from the image or the data from a large number of contour points may be used in conjunction with a cutter operated by a reducing pantograph to cut the secondary key.

The binary coded decimal (BCD) outputs of X and Y axis position numbers from the readout system (FIG. 9d) may be used to punch a paper tape or to input automatically the memory of a digital computer. In either case the secondary key may be cut automatically by numerical control machining techniques requiring stepping motor drives to be added to both the X and Y axes of the key cutting apparatus.

Alternatively, after all X and Y axis position numbers have been printed out they may be loaded manually into the memory of a digital computer or inserted manually into a programmable controller for automatic operation of stepping motor drives on the key cutting apparatus as noted above, cutting the secondary key in that manner.

What is claimed is:

1. A method of producing a secondary key from a primary key comprising the steps of:
    (a) making a dimensionally stable three dimensional recording of at least one side of the primary key in a pliable material, said recording showing contours and locations of warding grooves and bits and key blank shape;
    (b) comparing the recordings so made with available key blanks to determine the proper key blank to be used;
    (c) determining the contour of each bit on the key;
    (d) determining the X and Y position with respect to fixed surfaces on the key of the center of the bottom of each bit; and
    (e) using said bit contour information and X and Y information for cutting a secondary key with the required bits, from the proper key blank.

2. The method of claim 1 wherein said pliable material is a metallic foil.

3. The method according to claim 1 wherein said contour is determined by measuring a plurality of points along a bit and cutting said secondary key on a point to point basis using said measurements.

4. The method according to claim 1 and further including the steps of:
    (a) making said recordings at a first location;
    (b) sealing said recordings in a coded envelope in the presence of the owner of the key;
    (c) mailing said key to a remote manufacturing location;
    (d) after the secondary key is made mailing said key only identified by said code number back to the first location; and
    (e) opening the package only in the presence of the owner of the primary key.

5. The method according to claim 4 wherein said pliable recording material comprises metallic foil.

6. The method according to claim 1, wherein said step of determining the contour of each bit comprises:
    (a) providing a plurality of templates in the shape of bit contours, on an enlarged scale, based on known key manufacturers data;
    (b) displaying at least one of said recordings by means of an enlarged optical projection on a screen, the enlargement being of the same degree as the enlargement of the templates; and
    (c) comparing the bit contours displayed on the screen with the templates in order to select a template which matches the displayed contour, and wherein said step of cutting comprises
    (d) providing a plurality of milling cutters contours corresponding to those of said templates;
    (e) selecting the milling cutter which corresponds to the template which matches the displayed contour; and
    (f) using said corresponding milling cutter to cut a bit in said key.

7. The method according to claim 1, wherein said step of recording is done at a first location and the remaining steps at a second location whereby the person making the recording need know nothing about key making.

8. The method according to claim 1, wherein said step of making a three dimensional recording comprises the steps of:
    (a) placing the primary key and a pliable member of dimensions to accommodate the size of the primary key in overlying fixed relationship relative to each other; and (b) applying a pressure between said pliable material and key to press said key and pliable material together such that the pliable material is forced into and around indentations on said key thereby making a recording.

9. The method according to claim 8 wherein said pliable member comprises a piece of metallic foil secured between at least two sides of a frame, said metallic foil being placed over said key and wherein said step of applying a pressure comprises moving an elastic roller over said foil.

10. The method according to claim 1, wherein said step of determining the contour of each bit comprises:
  (a) comparing the bit contours on the recording with known bit contours;
  (b) providing a plurality of milling cutters having contours corresponding to said known bit contours;
  (c) selecting the milling cutter which corresponds to the identified contour; and
  (d) using said selected milling cutter to cut a bit in said key.

* * * * *